United States Patent [19]
Chang

[11] Patent Number: 6,094,163
[45] Date of Patent: Jul. 25, 2000

[54] INS ALIGNMENT METHOD USING A DOPPLER SENSOR AND A GPS/HVINS

[75] Inventor: Min-I James Chang, P.O. Box 5283, Herndon, Va. 20172-1978

[73] Assignee: Min-I James Chang, Herndon, Va.

[21] Appl. No.: 09/009,918

[22] Filed: Jan. 21, 1998

[51] Int. Cl.$^7$ .............................. G01S 5/02; H04B 7/185
[52] U.S. Cl. ............................. 342/357.06; 342/357.05; 701/213
[58] Field of Search ................................... 342/357, 352; 455/12.1; 701/213, 220

[56] References Cited

U.S. PATENT DOCUMENTS

| | | |
|---|---|---|
| 3,750,456 | 8/1973 | Walker . |
| 5,574,650 | 11/1996 | Diesel . |
| 5,657,025 | 8/1997 | Ebner et al. .............................. 342/357 |
| 5,672,872 | 9/1997 | Wu et al. .............................. 250/330 |

*Primary Examiner*—Thomas H. Tarcza
*Assistant Examiner*—Dao L. Pham
*Attorney, Agent, or Firm*—Marc S. Kaufman

[57] ABSTRACT

Transfer/in-flight alignment technique using a Doppler velocity sensor. An aircraft navigation system (10 and/or 20), a Doppler velocity sensor (50) and an alignment filter (45) are used to align the inertial navigation system (4) of a slave vehicle. The velocity (and/or position) of the aircraft navigation system, the velocity (and/or position) of the slave vehicle's inertial navigation system (40) and the velocity measurement of a Doppler velocity sensor (50) are used to generate the measurements of the alignment filter (45). The DVS and aircraft navigation system are used simultaneously to align the inertial navigation system of the slave vehicle. A GPS receiver (60) with a GPS antenna (70), a Doppler velocity sensor (50) and an alignment filer (46) are used to align the inertial navigation system (40) of a flight vehicle. The velocity (and/or position) of a GPS receiver (60), the velocity (and/or position) of the inertial navigation system (40) of a flight vehicle and the velocity measurement of a Doppler velocity sensor (50) are used to generate the measurements of the in-flight alignment filter (46).

17 Claims, 2 Drawing Sheets

INS ALIGNMENT METHOD USING A DOPPLER SENSOR AND A GPS/HVINS

BACKGROUND OF THE INVENTION

1. Field of the Invention

This invention relates to the transfer alignment/in-flight alignment of an inertial navigation system (INS).

2. Description of the Related Art

The conventional transfer alignment technique uses the velocity (and/or the position) of the host vehicle inertial navigation system (HVINS) to perform the alignment of the inertial navigation system of the slave vehicle. The conventional in-flight alignment technique uses the velocity (and/or the position) of GPS to perform the alignment of the inertial navigation system of a flight vehicle.

BRIEF SUMMARY OF THE INVENTION

The present invention uses additional sensor, a Doppler velocity sensor, to improve the capability and the performance of the currently existing transfer/in-flight alignment technique. The present invention transfer alignment method uses the velocity and/or position of the aircraft navigation system, the measurement of a Doppler velocity sensor on the slave vehicle and an alignment filter to improve the accuracy of the inertial navigation system of the slave vehicle of an aircraft The present invented in-flight alignment method uses the velocity and or the position of a GPS receiver, the measurement of a Doppler velocity sensor and an alignment filter to improve the accuracy of the inertial navigation system of a flight vehicle. The alignment filter of the invented transfer/in-flight alignment method is a Kalman filter or a least square filter or a combination of Kalman filter and least square filter.

FIG. 1 depicts the block diagram of a preferred embodiment of the present invention in transfer alignment method. The transfer alignment method is a method to align the inertial navigation system 40 of a slave vehicle using an aircraft navigation system 10 and/or 20 and a Doppler velocity sensor 50. The aircraft navigation system may be an inertial navigation system 10 or an integrated inertial navigation system 10 and GPS receiver 20. A CPS antenna 30 is mounted on the aircraft to receive GPS signal, if the host aircraft navigation system has a GPS receiver 20. The inertial navigation system 40 of the slave vehicle contains 3 accelerometers 41, 3 gyros 42, and a flight computer j43. The flight computer 43 performs navigation integration 44, the alignment filter 45 update, the aircraft interface and other functions. The inertial navigation system 40 is mounted inside the slave vehicle. The Doppler velocity sensor 50 is mounted on the button of the slave. The inertial navigation system 40 and the Doppler velocity sensor 50 are integrated through a alignment filter 45.

FIG. 2 depicts the block diagram of the preferred embodiment in in-flight alignment method. The invented in-flight alignment method is a method to align the inertial navigation system 40 of a flight vehicle using a GPS receiver 60 and a Doppler velocity sensor 50. The inertial navigation system 40 of the flight vehicle contains 3 accelerometers 41, 3 gyros 42, and a flight computer 43. The flight computer 43 performs the navigation integration 44, the alignment filter 46 update and other functions. The inertial navigation system 40 and the GPS receiver 60 are mounted inside the flight vehicle to measure the rotation rate and the specific force of the flight vehicle. A GPS antenna 70 is mounted on the top of the flight vehicle. A Doppler velocity sensor 50 is mounted on the button of the flight vehicle. A Doppler velocity sensor 50 is mounted on the button of the flight vehicle. The GPS receiver 60, the inertial navigation system 40 and the Doppler velocity sensor 50 are integrated through an alignment filter 46.

FIG. 3 shows that the velocity of a trajectory that is used for the generalized covariance analysis. FIG. 3 indicates that the vehicle holds constant horizontal velocity for the first 60 seconds of flight and makes a S-turn during X to Y seconds of flight.

FIG. 4 shows that the results of the covariance analysis of the present invention and the currently existing transfer/in-flight alignment Kalman filter. The covariance analysis results show that the present invented alignment method is able to estimate and remove the heading error of the inertial navigation system regardless the vehicle dynamics and has rapid alignment capability. In fact, it is able to estimate and to remove the heading error of the inertial navigation system within 5 seconds. According to FIG. 3 the vehicle holds constant horizontal velocity for the first 60 seconds of flight and initiates S-turn at 60 seconds of flight. FIG. 4 indicated the conventional alignment method cannot estimate the heading error of the inertial navigation system until the maneuvering takes place.

Both the conventional transfer and in-flight alignment can only align the heading error of an inertial navigation system when host vehicle maneuvering such as S-turns is taking place. The conventional alignment method cannot estimate and remove the heading error if the host vehicle does not maneuver during transfer/in-flight alignment (U.S. Pat. No. 5,657,025, column 1, lines 23–25 and U.S. Pat. No. 5,672,872 column 4, lines 62–66). The heading error will build up continuously, if the host vehicle does not maneuver (U.S. Pat. No. 5,657,025, column 1, lines 25–30). Both the aircraft safety and the life of the pilot are at risk, if an aircraft pilot is required to maneuver before a missile launch in highly defensive enemy territory. It is very desirable to have a transfer/in-flight alignment method that does not require the host vehicle to make any maneuvering during alignment. In additions, the currently existing transfer/ in-flight alignment Kalman filter is also sensitive to the vehicle dynamics. The preferred embodiment modifies the currently existing transfer/in-flight alignment technique by using an additional sensor, a Doppler velocity sensor, to achiever the following goals:

- to estimate and to remove the heading error due to gyro drift any time during the mission regardless the vehicle dynamics,
- to correct the heading error of the inertial navigation system without maneuvering,
- to prevent the heading error of an inertial navigation system build up,
- to improve the heading accuracy of the inertial sensor of a flight vehicle,
- to achiever rapid alignment capability,
- to minimize the Kalman filter sensitivity to the vehicle dynamics.

In accordance with the invention, a transfer/in-flight alignment method is disclosed for the alignment of an inertial navigation system.

The conventional transfer alignment method uses the velocity (and/or the position) from the aircraft navigation system to align the inertial navigation system of the slave vehicle through an alignment filter. The slave vehicle may be a missile or a guided bomb that is carried by the host aircraft The aircraft navigation may be an inertial navigation system or an integrated GPS and inertial navigation system The present invention proposes to use additional sensor, a Doppler velocity sensor to obtain additional measurement to enhance the capability of the currently existing transfer alignment method in estimating and correcting the heading error of the inertial navigation of the s lave vehicle. The additional measurement is the difference of the instantaneous velocity (or the difference of the average velocity) measured by a Doppler velocity sensor and the instantaneous reference velocity (or the difference of the average reference velocity). The reference velocity is the velocity obtained form the aircraft navigation system or the velocity of the inertial navigation system of the slave vehicle updated by the aircraft velocity (and/or position). The additional alignment filter measurement generated from the Doppler velocity sensor measurements and the aircraft velocity may be in any coordinate system. The Doppler velocity sensor is mounted on the button of the slave vehicle and measures the velocity of the slave vehicle with respect to a coordinate system fixed to the body of the slave vehicle. The inertial sensor system of the slave vehicle consists of 3 accelerometers, 3 gyros and a flight computer. The flight computer performs the navigation integration, the transfer alignment filter update, aircraft interface and some other functions. The alignment filter of the invent ed transfer alignment method is a Kalman filter or a least square filter or a combination of a Kalman filter and a least square filter.

The conventional in-flight alignment uses the GPS measurements to align the inertial navigation system of a flight vehicle through an alignment filter. The flight vehicle may be an aircraft or a missile or a guided bomb or an unmanned air vehicle. The GPS receiver may be a stand-alone GPS receiver or a GPS card embedded in the flight computer of the inertial navigation system of the flight vehicle. The conventional in-flight alignment filter uses the velocity (and/or the position) of GPS to align the inertial navigation system of a flight vehicle. Similar to the transfer alignment, the present invention proposes to use an additional sensor, a Doppler velocity to enhance the performance and the capability of the currently existing in-flight alignment filter. A Doppler velocity sensor is mounted on the button of the slave vehicle and measures the velocity of the flight vehicle with respect to a coordinate system fixed to the body of the flight vehicle. The inertial navigation system, the Doppler velocity sensor and GPS receiver are integrated through an alignment filter. The Doppler velocity sensor measurements are sued to generate additional alignment filter measurement. The additional measurement is the difference of the instantaneous (or averaged) reference velocity. The reference velocity is the GPS velocity or the velocity of the inertial navigation system of the slave vehicle update by the GPS. The additional alignment filter measurement generated from the Doppler velocity sensor and the GPS may be resolved in any coordinate system.

DETAILED DESCRIPTION

Figure 1:
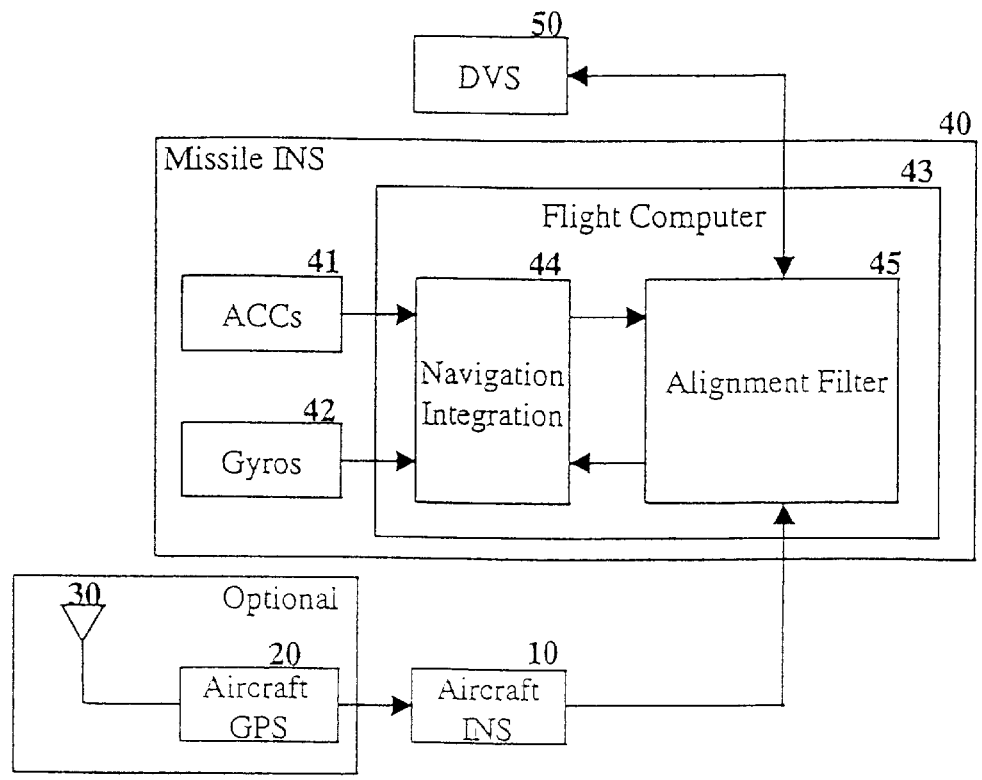
FIG. 1 is the block diagram of the invented transfer alignment.
Figure 2:
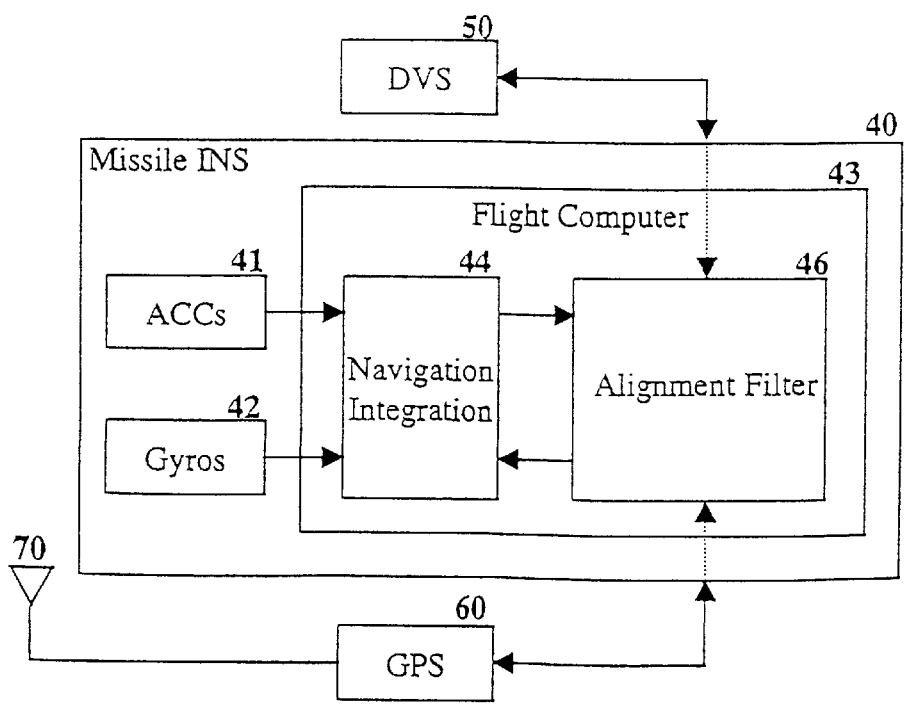
FIG. 2 is the block diagram of the invented in-flight alignment.

The following description of the preferred embodiments of the invention shown in the FIG. 1 and FIG. 2 is merely exemplary in nature and is no way intended to limit the invention or its applications or uses.

The transfer alignment method is a technique to align the inertial navigation system of a slave vehicle using the navigation system of its host aircraft. A slave vehicle is a vehicle such as a missile or a guided bomb that is carried by the host aircraft. The navigation system of the host aircraft may be an inertial navigation system or an integrated inertial navigation system and GPS receiver. A GPS antenna that receives GPS signals for the GPS receiver is mounted on the top of the host aircraft, if a GPS receiver is installed on the aircraft The currently existing transfer alignment method uses the host aircraft navigation system to align the inertial navigation of the slave vehicle through an alignment filter such as a Kalman filter. The measurements of the currently existing transfer alignment filter are the difference of the velocity (and/or the position) of the inertial navigation system of the slave vehicle and the velocity (and/or the position) of the aircraft navigation system.

The in-flight alignment is a technique to align the inertial navigation system of a flight vehicle using GPS. The flight vehicle may be an aircraft or a missile or a guided bomb or an unmanned air vehicle. The currently existing in-flight alignment method uses GPS measurements to align the inertial navigation system of the flight vehicle through an alignment such as a Kalman filter. The measurements of the currently existing in-flight alignment filter are the difference of the velocity (and/or the position) of the inertial navigation system of the flight vehicle and the velocity (and/or the position) of the GPS.

Both the currently existing transfer and in-flight alignment can only estimate and remove the heading error of the inertial navigation system when the host vehicle maneuvering such as S-turns is taking place. The conventional alignment method can not estimate and remove the heading error if the host vehicle does not maneuver (U.S. Pat. No. 5,657, 025, column 1, lines 23–25 and U.S. Pat. No. 5,462,872, column 4, lines 62–66). The heading error will build continuously, if the host vehicle does not maneuver (U.S. Pat. No. 5,657,025, column 1 lines 25–30). Both the aircraft safety and the life of the pilot are at risk, if it requires an aircraft pilot to make maneuvering before missile launch in the highly defensive enemy territory. It is very desirable to have a transfer/in-flight alignment method that does not require the host vehicle to make any maneuvering during alignment. In addition, the conventional transfer/in-flight alignment filter is sensitive to the vehicle dynamics. The maneuvering requirement during the transfer/in-flight alignment and the heading error building up during no maneuvering period are very much not desirable.

The preferred embodiment of the present invention, as shown in FIG. 1, proposes to add additional sensor, a Doppler velocity sensor, to the currently existing transfer alignment technique to achieve the following goals:
  to estimate and to remover the heading error due to initialization error and gyro drift any time during the mission regardless the vehicle dynamics,
  to correct the heading error of the inertial navigation system without maneuvering,
  to prevent the heading error of an inertial navigation system build up,
  to improve the heading accuracy of the inertial sensor of a flight vehicle,
  to achieve rapid alignment capability,
  to minimize the alignment filter sensitivity to the vehicle dynamics.

To accomplish these goals of the present invention in transfer alignment method, the present invention proposes to add a Doppler velocity sensor to the existing transfer alignment method to obtain additional alignment filter measurement The alignment filter of the present invention can be a Kalman filter or a least square filter or a combination of a Kalman filter and a least square filter. The additional measurement is computed from the instantaneous or the averaged Doppler velocity sensor measurement. It is difference of the instantaneous (or the average) velocity measured by a Doppler velocity sensor 50 and the instantaneous (or the average) of the reference velocity. The reference velocity is the aircraft velocity or the velocity of the inertial navigation system 40 of the slave vehicle updated by the aircraft velocity (and/or the aircraft position). The coordinate system that is used to compute the additional alignment filter measurement is named the coordinate system A. It can be any coordinate system such as a navigation coordinate system or a coordinate system fixed to the body of the slave vehicle. The aircraft velocity is obtained from the aircraft navigation system through the aircraft interface bus. The aircraft navigation system may be a stand-alone inertial navigation system 10 or an integrated inertial navigation system 10 and GPS receiver 20. The aircraft GPS receiver 20 has a GPS antenna 30 that is mounted on the top of the aircraft to receive GPS signals. The Doppler velocity sensor 50 is mounted on the button of the slave vehicle to measure the velocity of the slave vehicle with respect to a coordinate system fixed to the body of the slave vehicle. The aircraft navigation system provides the velocity of the slave vehicle resolved on a navigation coordinate system. Both the Doppler velocity sensor measurement and the velocity obtained from the aircraft navigation system are transformed to the coordinate system A for the computation of the additional alignment filter measurement. The inertial sensor system 40 of the slave vehicle consists of 3 accelerometers 41, 3 gyros 42 and a flight computer 43. The flight computer performs the navigation integration 44, the propagation and the update of the transfer alignment filter 45, aircraft interface and some other functions.

The velocity computed from the inertial navigation system of the slave vehicle is computed on a navigation coordinate system. It is transformed to the coordinate system A if the velocity updated by the currently existing alignment filter is used to compute the additional alignment filter.

The present invention of the transfer alignment method is performed as follows:

A0. Initialize the inertial navigation system of the slave vehicle.

A1. Perform navigation integration of the measurements of the inertial navigation system of the slave vehicle to yield the velocity and the position of the slave vehicle at a high rate.

A2. Compute the measurements of the currently existing transfer alignment filter. They are:

the velocity difference of the velocity of the slave vehicle computed by the aircraft navigation system and the velocity of the slave vehicle computed by the inertial navigation system of the slave vehicle.

and/or the position difference of the velocity of the slave vehicle computed by the aircraft navigation system and the position of the slave vehicle computed by the inertial navigation system of the slave vehicle.

A3. Compute the transformation matrices and transform the Doppler velocity sensor measurement and the aircraft velocity (or the velocity computed by the inertial navigation of the slave vehicle and updated by the aircraft navigation system) to the coordinate system A.

A4. Compute the additional measurement of the transfer alignment filter using the velocity computed from step A3. The additional alignment filter measurement is the velocity difference of the velocity of the slave vehicle computed by the Doppler velocity sensor and the velocity of the slave vehicle computed by the aircraft navigation system.

or the velocity difference of the velocity of the slave vehicle computed by the Doppler velocity sensor and the velocity of the slave vehicle computed by the inertial navigation system of the slave vehicle and updated by the aircraft navigation system.

The additional measurement of the transfer alignment filter may be computed from the instantaneous velocity or the average velocity.

A5. Compute the filter measurement matrix, propagate and update the transfer alignment filter using the currently existing alignment filter measurements and the additional alignment filter measurement at a low rate.

A6. Applied the alignment filter estimate to correct the position, the velocity and attitude error of the inertial navigation system of the slave vehicle. Update the inertial sensor error coefficients and/or the Doppler velocity sensor error coefficients using the alignment filter estimates and reset the alignment filter states.

A7. Repeat Step A1 to Step A7.

The preferred embodiment of the present invention as shown in FIG. 2, proposes to use additional sensor for the currently existing in-flight alignment technique to achieve the following goals:

to estimate and to remove the heading error due to initialization error and gyro drift any time during the mission regardless the vehicle dynamics, to improve the heading accuracy of the inertial sensor of a flight vehicle, to achieve rapid alignment capability, to minimizes the alignment filter sensitivity to the vehicle dynamics.

To accomplish these goals of the present invention in in-flight alignment method, the present invention proposes to add a Doppler velocity sensor to the existing inflight alignment method to obtain additional alignment filter measurement The alignment filter of the present invention can be a Kalman filter or a least square filter or a combination of Kalman filter and a least square filter. The additional measurement is computed from the instantaneous (or averaged) velocity of the Doppler velocity sensor. It is the difference of the instantaneous (or averaged) velocity measured by a Doppler velocity sensor 50 and the instantaneous (or averaged) of the reference velocity. The reference velocity is the velocity obtained from a GPS receiver 60 or the velocity of the inertial navigation system 40 of the flight vehicle updated by the GPS velocity and or position. The coordinate system that is used to compute the additional alignment filter measurement is called the coordinate system A. It can be any coordinate system such as a navigation coordinate system or a coordinate system fixed to the body of the flight vehicle. The GPS receiver 60 may be a stand-alone GPS receiver or a GPS card embedded in the flight computer of the inertial navigation system of the flight vehicle. The GPS receiver 60 has a GPS antenna 70. The GPS antenna 70 is mounted on the top of the flight vehicle to receive GPS signals. The Doppler velocity sensor 50 is mounted on the button of the flight vehicle to measure the velocity of the slave vehicle with respect to a coordinate system fixed to the body of the slave vehicle. The GPS receiver provides the velocity of the flight vehicle resolved on a navigation coordinate system. Both the Doppler velocity sensor measurement and the GPS velocity are transformed to the coordinate system A for the computation of the additional alignment filter measurement. The inertial sensor system 40 of the flight vehicle consists of 3 accelerometers 41, 3 gyros 42 and a flight computer 43. The flight computer performs the navigation integration 44, the propagation and the update of the in-flight alignment filter 45 and some other functions. The velocity computed from the inertial navigation system of the flight vehicle is computed on a navigation coordinate system. It is transformed to the coordinate system A if the velocity updated by the currently existing alignment filter is used to compute the additional alignment filter measurement.

The present invention of the in-flight alignment method is performed as follows:

B0. Initialize the inertial navigation system of the slave vehicle.

B1. Perform navigation integration of the measurements of the inertial navigation system of the flight vehicle to yield the velocity and the position of the flight vehicle at a high rate.

B2. Compute the measurements of the currently existing in-flight alignment filter. They are:

the velocity difference of the velocity of the slave vehicle computed by the GPS and the velocity of the slave vehicle computed by the inertial navigation system of the slave vehicle and/or the position difference of the velocity of the slave vehicle computed by the GPS and the position of the slave vehicle computed by the inertial navigation system of the slave vehicle.

B3. Compute the transformation matrices and transform the Doppler velocity sensor measurement and the GPS velocity (or the velocity computed by the inertial navigation of the flight vehicle and updated by GPS measurements) to the coordinate system A.

B4. Compute the additional measurement of the in-flight alignment filter using the velocity computed from step B3. The additional alignment filter measurement is the velocity difference of the velocity of the slave vehicle computed by the Doppler velocity sensor and the velocity of the slave vehicle computed by the GPS, or the velocity difference of the velocity of the slave vehicle computed by the Doppler velocity sensor and the velocity of the slave vehicle computed by the inertial navigation system of the slave vehicle and updated by the GPS.

The additional measurement of the in-flight alignment filter may be computed from the instantaneous velocity or the average velocity.

B5. Compute the filter measurement matrix, propagate and update the in-flight alignment filter using the currently existing alignment filter measurements and the additional alignment filter measurement at a low rate.

B6. Applied the alignment filter estimate to correct the position, the velocity and attitude error of the inertial navigation system of the flight vehicle. Update the inertial sensor error coefficients and/or the Doppler velocity sensor error coefficients using the alignment filter estimates and reset the alignment filter states.

B7. Repeat Step B1 to Step B7.

Figure 3:
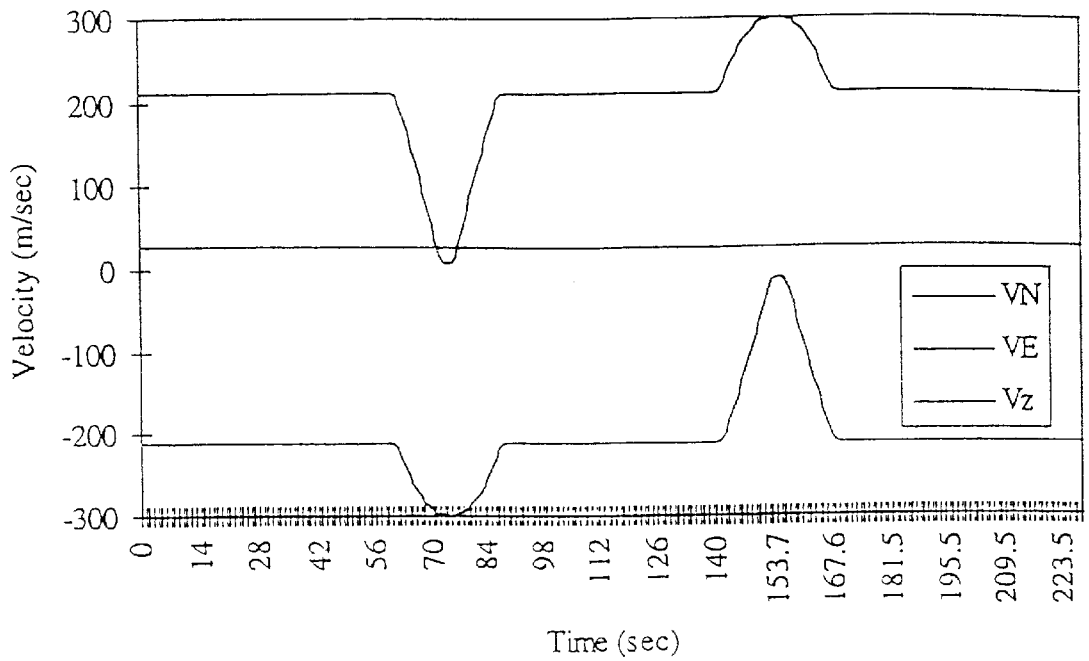
FIG. 3 is the velocity of the trajectory for covariance analysis.
Figure 4:
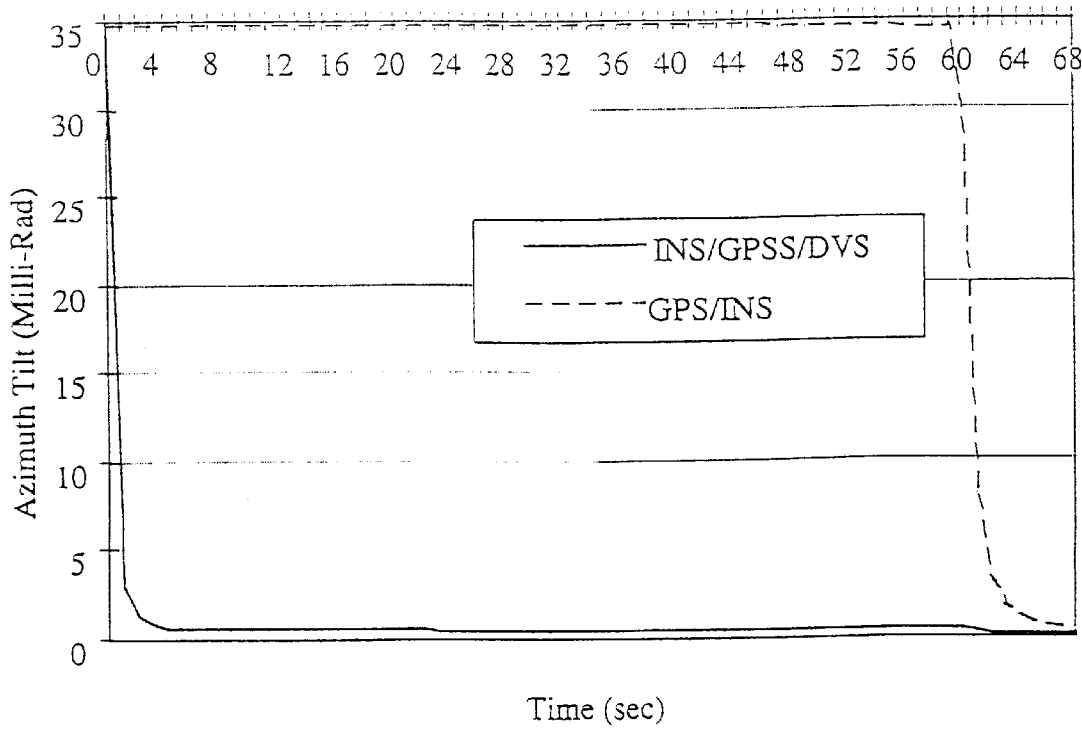
FIG. 4 is the covariance analysis results of the present invention and the currently existing transfer/in-flight alignment filter.

Covariance analysis is a well-known computer tool for the analysis and evaluation of the performance of the alignment filter of transfer/in-flight alignment methods. A covariance analysis has been conducted to demonstrate that the present invention can rapidly align an inertial navigation system without maneuvering. FIG. 3 shows the velocity profile of the trajectory that is used for covariance. FIG. 4 shows the covariance analysis results of the present invention and the currently existing transfer/inflight alignment filter. FIG. 3 indicates the horizontal velocity of the vehicle remains constant for the first 60 seconds and the S-turn takes place during 61 to 90 second. FIG. 4 indicates the currently existing alignment filter can not estimate the heading error until the S-turn takes place. However, the present invented alignment method is able to estimate and remove the heading error while the vehicle still holds constant horizontal velocity. In fact, the present invention is able rapidly to estimate and remove the heading error of the inertial navigation system. The time that requires for the present invention to estimate and remove the heading error is less than 5 seconds. The covariance analysis results demonstrate that the present invention eliminates maneuvering requirement of the current existing alignment method and has rapid alignment capability.

The additional transfer alignment filter measurement that computed from the aircraft velocity and the velocity of the vehicle with respect a coordinate system fixed to the vehicle body measured by a Doppler velocity sensor is the heart of the present invention for transfer alignment method. Similarly, the additional in-flight alignment filter measurement that computed from the GPS velocity and the velocity of the vehicle with respect a coordinate system fixed to the vehicle body measured by a Doppler velocity sensor is the heart of the present invention for in-flight alignment method. In conclusion, the simultaneous use of the aircraft velocity (or the velocity of the inertial navigation system of the slave vehicle updated by the aircraft navigation system) and the Doppler velocity sensor measurement assures that the transfer alignment filter is capable of estimating and removing the heading error of an INS regardless of the vehicle dynamics. Similarly, the simultaneous use of the GPS velocity (or the velocity of the inertial navigation system of the flight vehicle updated by GPS) with the Doppler velocity sensor measurement assures that the in-flight alignment filter is able to estimate and remove the healing error regardless of the vehicle dynamics. The reader will see that I have provided a method that can rapidly align an inertial navigation system without maneuvering. It can continuously estimate and remove the inertial sensor errors regardless the host vehicle dynamics.

Although the description above contains much specificity, these should not be construed as limiting the scope of the invention but as merely providing illustrations of some of the presently preferred embodiments of this invention. Various embodiments and ramifications are possible within its scope. Thus the scope of the invention should be determined by the appended claims and their legal equivalents. heading error regardless of the vehicle dynamics. The reader will see that I have provided a method that can rapidly align an inertial navigation system without maneuvering. It can continuously estimate and remove the inertial sensor errors regardless the host vehicle dynamics.

Although the description above contains much specificity, these should not be construed as limiting the scope of the invention but as merely providing illustrations of some of the presently preferred embodiments of this invention. Various embodiments and ramifications are possible within its scope. Thus the scope of the invention should be determined by the appended claims and their legal equivalents, rather than by the examples given.

What is claimed is:

1. A transfer alignment system for aligning an inertial navigation system of a slave vehicle comprising:

an inertial navigation system installed in the slave vehicle and providing the position, velocity and attitude of the slave vehicle;

a Doppler velocity sensor installed in the slave vehicle and providing the velocity of the slave vehicle with respect to a coordinate system fixed to the body of the slave vehicle;

one of an inertial navigation system and an integrated global positioning system/inertial navigation system installed in an aircraft carrying the slave vehicle and providing the position, velocity and attitude of the aircraft; and a transfer alignment filter updated by a velocity measurement of the Doppler velocity sensor and at least one of the velocity and the position of a host aircraft navigation system.

2. The system according to claim 1 wherein the transfer alignment filter is a Kalman filter, a least square filter or a combination of a Kalman filter and a least square filter.

3. The system according in claim 1 wherein the inertial navigation system comprises 3 accelerometers, 3 gyros and a flight computer that computes the position, the velocity, and the attitude of the slave vehicle, updates the alignment filter, and performs the guidance and control functions of the slave vehicle.

4. The system according to claim 1 wherein the inertial navigation system is initialized by the aircraft navigation system, by a magnetic detector or by a gyrocompass.

5. The system according to claim 1 wherein the transfer alignment filter is updated by at least one of:

the difference of the instantaneous velocity measurements of the Doppler velocity sensor and the instantaneous velocity of the aircraft navigation system or the inertial navigation system of the slave vehicle;

the difference of the average velocity measurements of the Doppler velocity sensor and the average velocity of the aircraft navigation system or the inertial navigation system of the slave vehicle;

the difference of the instantaneous velocity of the aircraft navigation system and the instantaneous velocity of the inertial navigation system of the slave vehicle;

the difference of the average velocity of the aircraft navigation system and the average velocity of the inertial navigation system of the slave vehicle;

the difference of the incremental position of the aircraft navigation system and the average velocity of the inertial navigation system of the slave vehicle;

the difference of the position of the aircraft navigation system and the position of the inertial navigation system of the slave vehicle.

6. The system as recited in claim 1 wherein the transfer alignment filter uses a Cartesian coordinate system or a coordinate system fixed to the body of the slave vehicle.

7. The system according to claim 5 wherein the transfer alignment filter measurement uses at least one of a linear function of alignment error, a reference velocity error of the Doppler velocity sensor and errors of the inertial sensor of the slave vehicle.

8. The system according to claim 7 wherein the reference velocity is a velocity obtained from the aircraft navigation system or a velocity computed by the inertial navigation system of the flight vehicle and updated by the aircraft navigation system.

9. An in-flight alignment system for aligning an inertial navigation system of a flight vehicle such as an aircraft or a missile or a guided bomb or an unmanned air vehicle, said system comprising an inertial navigation system installed in a flight vehicle and providing the position, velocity and attitude of the flight vehicle;

a Doppler velocity sensor installed in the flight vehicle and providing the velocity of the flight vehicle with respect to a coordinate system fixed to a body of the flight vehicle;

a global position system receiver installed in the flight vehicle, and providing velocity and position of the flight vehicle with respect to a navigation coordinate system;

a global positioning system antenna mounted on the flight vehicle and providing a global positioning system signal to the global positioning system receiver;

an in-flight alignment filter updated by the velocity measurement of the Doppler velocity sensor, and at least one of the velocity and the position of the global positioning system.

10. The system according to claim 9 wherein the alignment filter is a Kalman filter, a least square filter or a combination of a Kalman filter and a least square filter.

11. The system according to claim 9 wherein the inertial navigation system comprises 3 gyros, 3 accelerometers and a flight computer that computes the position, velocity and attitude of the flight vehicle, updates the in-flight alignment filter, and performs navigation, guidance and control functions of the flight vehicle.

12. The system according to claim 9 wherein the inertial navigation system is initialized by a magnetic detector or a gyrocompass.

13. The system according to claim 9 wherein the alignment filter is updated by at least one of:

the difference of an instantaneous velocity measurements of the Doppler velocity system and the instantaneous velocity of the global positioning system, the difference of an average velocity measurements of the Doppler velocity sensor and an average global positioning system velocity;

the difference of an instantaneous global positioning system velocity and an instantaneous velocity computed by the inertial navigation system of the flight vehicle;

the difference of an average global positioning system velocity and an average velocity computed by the inertial navigation system of the flight vehicles;

the difference of an incremental position of the global positioning system and the incremental position computed by the inertial navigation system of the flight vehicle;

the difference of a position of the global positioning system and a position computed by the inertial navigation system of the flight vehicle.

14. The system as recited in claim 9 wherein the in-flight alignment filter uses a Cartesian coordinate system or a coordinate system fixed to the body of the flight vehicle.

15. The system according to claim 13 wherein the in-flight alignment filter uses a linear function of alignment error, reference velocity error of the Doppler velocity sensor errors of the inertial sensor of the flight vehicle.

16. The system according to claim 15 wherein the reference velocity is global positioning system velocity, Doppler velocity system velocity measurement or velocity computed by the inertial navigation system of the flight vehicle and updated by the global positioning system.

17. A transfer alignment system for aligning an inertial navigation system of a slave vehicle comprising:

an inertial navigation system installed in the slave vehicle;

a Doppler velocity sensor installed in the slave vehicle and providing the velocity of the slave vehicle with respect to a coordinate system fixed to the body of the slave vehicle;

one of an inertial navigation system and an integrated global positioning system/inertial navigation system installed in an aircraft carrying the slave vehicle; and a transfer alignment filter updated by a velocity measurement of the Doppler velocity sensor.

* * * * *